US008105168B2

(12) United States Patent
Gioia et al.

(10) Patent No.: US 8,105,168 B2
(45) **Date of Patent: *Jan. 31, 2012**

(54) METHOD AND COMPUTER READABLE MEDIUM RELATING TO VIRTUAL PLAYING INSTRUMENTS

(75) Inventors: Gene George Gioia, Wheat Ridge, CO (US); Andrew Nicholas Gioia, Wheat Ridge, CO (US); Brendan Michael Fogarty, Gilbert, AZ (US)

(73) Assignee: Gioia Systems, LLC, Denver, CO (US)

( * ) Notice: Subject to any disclaimer, the term of this patent is extended or adjusted under 35 U.S.C. 154(b) by 799 days.

This patent is subject to a terminal disclaimer.

(21) Appl. No.: 12/236,332

(22) Filed: Sep. 23, 2008

(65) Prior Publication Data

US 2009/0017917 A1 Jan. 15, 2009

Related U.S. Application Data

(63) Continuation of application No. 11/427,244, filed on Jun. 28, 2006, now Pat. No. 7,766,331, which is a continuation-in-part of application No. 11/174,273, filed on Jul. 1, 2005, now Pat. No. 7,591,728.

(60) Provisional application No. 60/744,230, filed on Apr. 4, 2006.

(51) Int. Cl.
*G06F 17/00* (2006.01)
*G06F 19/00* (2011.01)
*A63F 1/12* (2006.01)
*A63F 1/14* (2006.01)

(52) U.S. Cl. ................ 463/42; 463/11; 463/13; 463/47; 273/149 R; 273/149 P; 273/309

(58) Field of Classification Search .............. 463/11–13, 463/42, 47; 273/148 R, 149 R, 149 P, 309
See application file for complete search history.

(56) References Cited

U.S. PATENT DOCUMENTS 2,185,474 A 1/1940 Nott
(Continued)

FOREIGN PATENT DOCUMENTS

GB 1376790 12/1974
(Continued)

OTHER PUBLICATIONS

Robert C. Hannum, et al. "Casino Math", Regulatory Issues, Second Edition, Trace Publications, 2005, pp. 251-252.

(Continued)

*Primary Examiner* — Milap Shah
(74) *Attorney, Agent, or Firm* — Banner & Witcoff, Ltd.

(57) ABSTRACT

Aspects of the present invention provide systems and methods relating to online gaming utilizing virtual playing instruments generated from physical playing instruments. According to one aspect of the invention, physical playing instruments are utilized in a gaming environment that may be scrambled, shuffled, and/or played remotely over a network. In one embodiment, the physical playing instruments are traditional poker-style gaming playing cards. The playing instruments include at least one identifier that may be read upon being dealt, such as identified and stored on a computer-readable medium before a game. In one such embodiment, computer-executable instructions may utilize the information on the computer-readable medium in conjunction with one or more games. Further aspects relate to validating the playing instruments and/or systems before, during, and/or after conducting one or more games with the playing instruments.

14 Claims, 12 Drawing Sheets

U.S. PATENT DOCUMENTS

| | | | | |
|---|---|---|---|---|
| 2,714,510 | A | 8/1955 | Oppenlander et al. | |
| 3,944,230 | A | 3/1976 | Fineman | |
| 4,339,798 | A | 7/1982 | Hedges et al. | |
| 4,467,424 | A | 8/1984 | Hedges et al. | |
| 4,521,187 | A | 6/1985 | Casper | |
| 4,531,187 | A | 7/1985 | Uhland | |
| 4,667,959 | A | 5/1987 | Pfeiffer et al. | |
| 4,969,648 | A | 11/1990 | Hollinger et al. | |
| 5,000,453 | A | 3/1991 | Stevens et al. | |
| 5,114,153 | A | 5/1992 | Rosenwinkel et al. | |
| 5,382,024 | A | 1/1995 | Blaha | |
| 5,397,133 | A | 3/1995 | Penzias | |
| 5,692,748 | A | 12/1997 | Frisco et al. | |
| 5,762,552 | A | 6/1998 | Vuong et al. | |
| 5,770,533 | A | 6/1998 | Franchi | |
| 5,800,268 | A | 9/1998 | Molnick | |
| 5,823,879 | A | 10/1998 | Goldberg et al. | |
| 5,830,067 | A | 11/1998 | Graves et al. | |
| 5,989,122 | A | 11/1999 | Roblejo | |
| 6,001,016 | A | 12/1999 | Walker et al. | |
| 6,165,069 | A | 12/2000 | Sines et al. | |
| 6,250,632 | B1 | 6/2001 | Albrecht | |
| 6,267,248 | B1 | 7/2001 | Johnson et al. | |
| 6,346,044 | B1 | 2/2002 | McCrea, Jr. | |
| 6,403,908 | B2 * | 6/2002 | Stardust et al. | 209/587 |
| 6,508,709 | B1 | 1/2003 | Karmarkar | |
| 6,575,834 | B1 | 6/2003 | Lindo | |
| 6,582,301 | B2 | 6/2003 | Hill | |
| 6,588,751 | B1 | 7/2003 | Grauzer et al. | |
| 6,651,982 | B2 | 11/2003 | Grauzer et al. | |
| 6,676,127 | B2 | 1/2004 | Johnson et al. | |
| 6,679,777 | B2 | 1/2004 | Pfeiffer et al. | |
| 6,729,621 | B2 | 5/2004 | Moody | |
| 6,755,741 | B1 | 6/2004 | Rafaeli | |
| 6,889,979 | B2 | 5/2005 | Blaha et al. | |
| 6,892,224 | B2 | 5/2005 | Strahm et al. | |
| 6,892,579 | B2 | 5/2005 | Ohtoyo et al. | |
| 6,898,579 | B1 | 5/2005 | Durfee et al. | |
| 6,991,540 | B2 | 1/2006 | Marlow | |
| 7,661,676 | B2 * | 2/2010 | Smith et al. | 273/149 R |
| 7,764,836 | B2 * | 7/2010 | Downs et al. | 382/181 |
| 7,769,232 | B2 * | 8/2010 | Downs, III | 382/181 |
| 7,976,023 | B1 * | 7/2011 | Hessing et al. | 273/149 R |
| 2002/0017481 | A1 | 2/2002 | Johnson et al. | |
| 2002/0068635 | A1 | 6/2002 | Hill | |
| 2002/0094869 | A1 | 7/2002 | Harkham | |
| 2002/0113368 | A1 | 8/2002 | Hessing et al. | |
| 2002/0147042 | A1 | 10/2002 | Vuong et al. | |
| 2003/0013510 | A1 | 1/2003 | Vuong et al. | |
| 2003/0144052 | A1 | 7/2003 | Walker et al. | |
| 2003/0195025 | A1 | 10/2003 | Hill | |
| 2004/0023722 | A1 | 2/2004 | Vuong et al. | |
| 2004/0067794 | A1 | 4/2004 | Coetzee | |
| 2004/0224777 | A1 | 11/2004 | Smith et al. | |
| 2004/0259618 | A1 * | 12/2004 | Soltys et al. | 463/11 |
| 2005/0051965 | A1 | 3/2005 | Gururajan | |
| 2005/0110210 | A1 * | 5/2005 | Soltys et al. | 273/149 P |
| 2005/0113166 | A1 * | 5/2005 | Grauzer et al. | 463/29 |
| 2006/0205508 | A1 | 9/2006 | Green | |
| 2007/0004499 | A1 | 1/2007 | Gioia et al. | |
| 2007/0015583 | A1 | 1/2007 | Tran | |
| 2007/0178955 | A1 | 8/2007 | Mills | |
| 2008/0315517 | A1 | 12/2008 | Toyama | |
| 2011/0042898 | A1 | 2/2011 | Downs | |

FOREIGN PATENT DOCUMENTS

| | | |
|---|---|---|
| WO | 9919027 | 4/1999 |

OTHER PUBLICATIONS

Holly Thomsen, “New AGA Survey Offers In-Depth Profile of U.S. Internet Gamblers—Press Release,” American Gaming Association, May 8, 2006.

Anthony N. Cabot, et al. “Gaming Regulation and Mathematics: A Marriageof Necessity,” The John Marshall Law Review, vol. 35, No. 3, Spring 2002.

Anthony N. Cabot, et al. “Poker: Public Policy, Law, Mathematics, and the Future of an American Tradition,” Thomas M. Cooley Law Review, vol. 22, No. 3, Michaelmas Term 2005.

Anthony N. Cabot, et al. “Advantage Play and Commercial Casinos,” Mississippi Law Journal, vol. 74, No. 3, Winter 2005.

* cited by examiner

METHOD AND COMPUTER READABLE MEDIUM RELATING TO VIRTUAL PLAYING INSTRUMENTS

PRIORITY INFORMATION

This application is a continuation of U.S. Non-Provisional application Ser. No. 11/427,244, filed Jun. 28, 2006, and now U.S. Pat. No. 7,776,331, which is a continuation-in-part of U.S. Non-Provisional Application No. 11/174,273, filed Jul. 1, 2005, and now U.S. Pat. No. 7,591,728, which claims the benefit of priority of U.S. Provisional Application No. 60/744,230, filed Apr. 4, 2006, the contents of which are incorporated by reference in their entirety.

TECHNICAL FIELD

This invention relates to gaming systems, and more particularly, to an apparatus and methods relating to virtual and physical gaming systems that may automatically generate and verify online gaming activity.

BACKGROUND OF THE INVENTION

Particularly in today's technological computer era, arcade games and other electronic devices have become very popular. As electronic games have increased in popularity, more casino-type games are enjoyed in a pure electronic format. One example is the usage of video poker. In concept, video poker is enjoyed similar to traditional poker games and is designed to replicate many aspects of a hand of poker. The video poker systems generate the deck or decks of cards based on an algorithm or a form of a random number generator, electronically produces visual representations of cards on a display device, and allows a user to determine which card to "hold" and which cards to "discard". The system then displays visual representations of replacement cards for the cards the player has discarded. The player wins or loses based on conventional poker hand rankings for the resulting five card hand.

While many aspects of the card game are recreated with the above mentioned systems, they lack several aspects of traditional card games and are prone to alteration and deception. For example, users of the electronic systems do not know if the machine really creates an accurate "deck" of cards, since there are no physical cards to verify. The users have no idea what algorithm is being utilized to "randomly" draw the cards and cannot be certain the software has not been altered to fix the odds. This is even true for a shuffling apparatus that "determines" the position within a deck a card will be placed according to a random number generator.

Previous attempts to meet demands from the industry and players alike have their limitations. One prior art attempt discloses a method and apparatus for automatically shuffling and cutting playing cards. The systems, however, still required a live dealer for manually scrambling the playing cards. Another system attempted to randomize shuffling by randomizing a cutting process within a stack of cards, however, cards in-between the "cuts" remain in proximity to each other and are not scrambled. Another attempt was directed to a shuffler having a shuffling mode where a stack of cards are fed into card storing spaces (or individual compartments) of a magazine. The cards are randomly allocated in a storage space of a magazine through the use of a random number generator and the cards are separated into the magazines rather than being intermingled.

Thus there is a need for methods and systems that enable players to enjoy amusement-type card games with assurance of accuracy and fairness. There also is a need to recreate traditional aspects of "live-dealing" in a card game. While semi-automated dealing machines have been utilized, there are no dealing machines currently available which can accurately recreate a dealer's shuffling and scrambling techniques. These and other advantages are successfully incorporated in embodiments of the present invention without sacrificing the element of amusement that many desire.

SUMMARY OF THE INVENTION

Aspects of the invention relate to gaming systems, and more particularly, to an apparatus and methods relating to a physical gaming system that may host remote players.

One aspect of the invention relates to fully automated systems and methods for shuffling and scrambling playing instruments, such as cards, before being dealt to one or more players. While some semi-automated card shufflers quickly shuffle one or more decks of cards, this does not adequately recreate live play. Indeed, those skilled in the art readily understand that even a good shuffling device cannot truly randomize cards, as only the cards actually displaced by the shuffler actually are re-arranged, thereby leaving the majority of the cards in the same order as before entering the shuffling device. When conducting live card games, either the dealer and/or a player will "scramble" the deck. Scrambling, also referred to as washing, is considered a more thorough randomizing technique where a person places the cards (generally face down) over a surface, such as a table, and randomly spreads the cards over the surface in a random fashion.

According to another aspect of the invention, physical cards are utilized in a gaming environment that may be scrambled, shuffled, and/or played remotely over a network. In one embodiment, the physical cards are traditional poker-style gaming cards. The cards include at least one identifier that may be read upon the card being dealt. The identifier may contain information that is remotely communicated to a computer-readable medium. In one embodiment, at least a portion of the identifying information of the cards being sequentially "dealt" are stored on a computer-readable medium. In one such embodiment, computer-executable instructions may utilize the information on the computer-readable medium in conjunction with one or more games.

Further aspects of the invention relate to fully automated systems and methods for scrambling cards before being dealt to one or more players. In one embodiment, a rotating device is utilized to scramble playing instruments. In yet a further embodiment, the rotating device comprises air, vacuum, or combinations thereof to further scramble the cards. The scrambling device may be coupled to an aligning device for realigning the playing instruments upon being adequately scrambled.

In certain embodiments of the invention, the present invention can be partially or wholly implemented with a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. Additional features and advantages of the invention will be apparent upon reviewing the following detailed description.

DETAILED DESCRIPTION OF THE INVENTION

Introduction

Figure 1A:
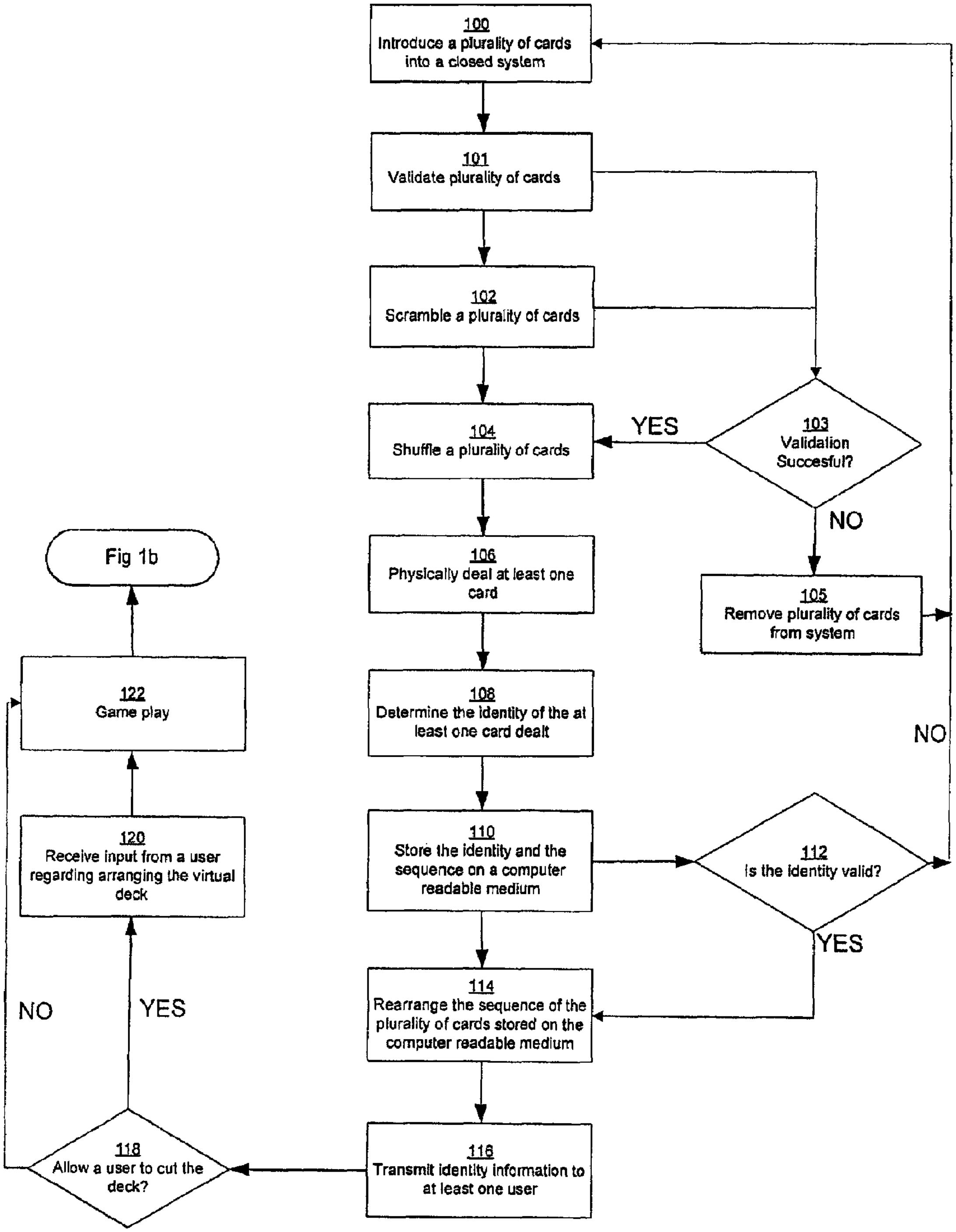
FIG. 1*a* is a flowchart depicting one exemplary method of preparing a virtual set of playing instruments according to one embodiment of the invention.

FIG. 1*a* is a flowchart depicting one exemplary method of preparing a virtual set of playing instruments. As one skilled in the art will appreciate, the exemplary method may be performed with a variety of gaming systems; however, to aid the reader in understanding the invention, the method of playing the exemplary card game will be shown by way of illustrating the exemplary embodiments disclosed in FIGS. 2-9. Moreover, the disclosed methods may comprise more or fewer steps, as it is understood the exemplary steps illustrate just one embodiment.

As shown in FIG. 1*a*, a plurality of playing instruments, such as cards, may be introduced into a closed system (step 100). As used herein, a "closed system" relates to one or more devices that are configured to conduct one or more processes without direct human intervention. In one embodiment, the closed system may be tamper-resistant or tamper-proof, wherein direct human intervention may cause the system to cease one or more operations and even reset operation. In yet another embodiment, direct human intervention may initiate the transmittal of an error message to one or more players, operators and/or third-parties. One skilled in the art will readily appreciate that a plurality of cards may be introduced through a variety of processes. In one embodiment, an unopened deck of playing cards sealed in polyurethane or cellophane wrapping is fed in to the system. In one such embodiment, any covering, such as a plastic wrapping may be mechanically removed, and the cards subsequently removed from a container, such as a cardboard box without direct human contact with the cards.

Figure 2:
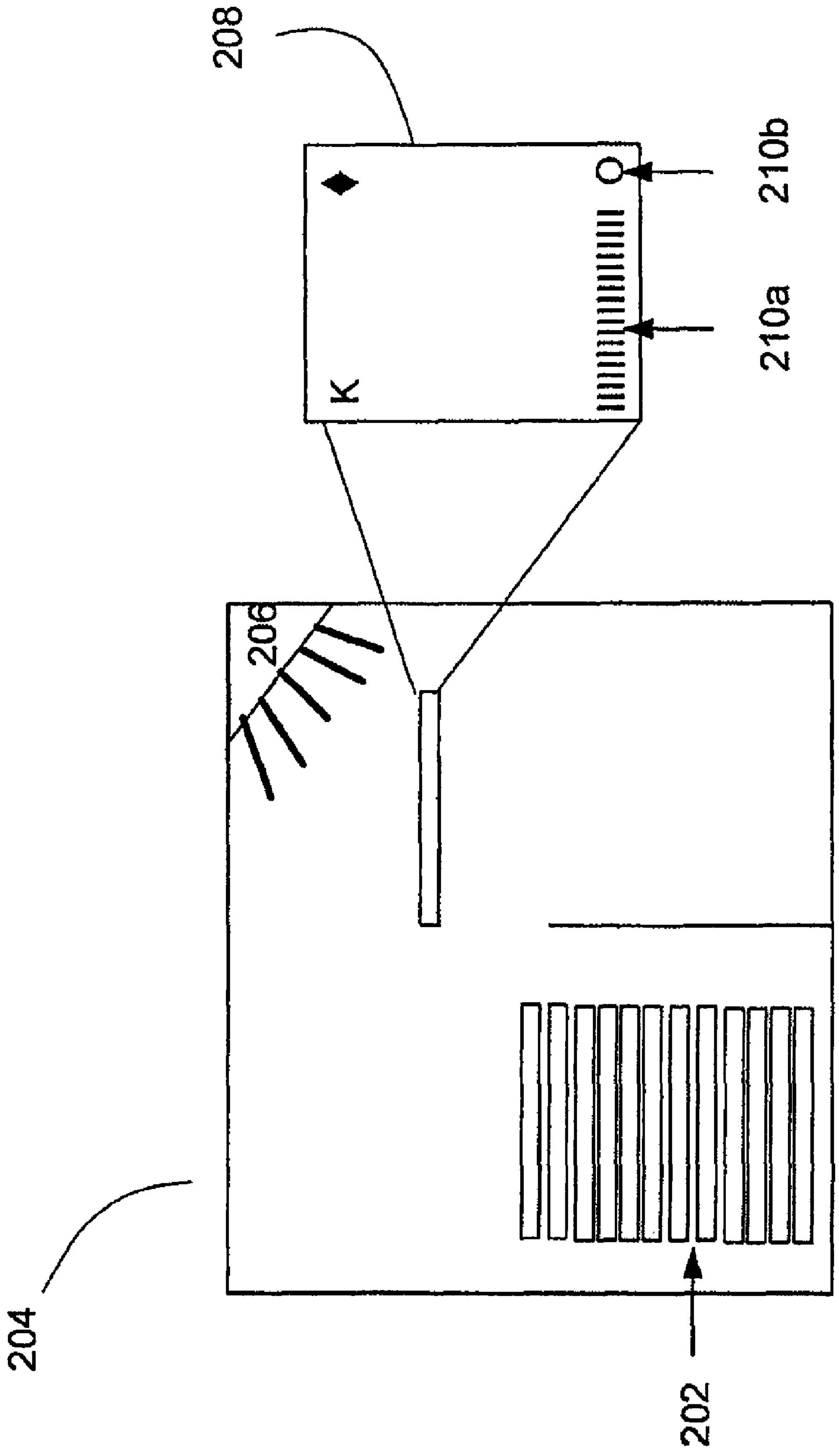
FIG. 2 depicts an exemplary card shuffling and dealing system according to one embodiment of the present invention.

Optional step 101 may then be initiated. In step 101, at least a portion of the plurality of cards introduced in step 100 are validated. In one embodiment, a card reader may be utilized to rapidly determine the validity of the cards. The card reader may determine the identity of the plurality of cards based on the presence of at least one identifier. As shown in FIG. 2, card 208 has a plurality of identifiers 210*a*, 210*b*. As used herein, an identifier can be any marking, attribute, and/or property of a card used in conjunction with a card reader, such as card reader 206 to identify the card. In one embodiment, the identifier contains information such as a source code for determining which deck or subset of cards the card originated from. For example, identifier 210*a* may comprise a scannable code, such as a bar code that is readable by card reader 206. Yet in other embodiments, reader 206 may be an RFID reader configured to read identifier 210*b*. In still yet other embodiments, the identifier 210*a* may comprise at least one physical alteration to the card, such as for example, a notch, groove, or extrusion that may be used with card reader 206 to identify the card. In still yet another embodiment, the identifier comprises a picture and/or text that is readable with a camera.

The identifiers 210*a*, 210*b* may comprise a plurality of information, such as but not limited to: a numerical value of the card and the "suit" (i.e., club, spade, heart) or other subset classification of the card. Indeed, in one embodiment, the identifier 210*a* may also aid in ensuring the fairness and accuracy of the game. In one embodiment incorporating step 101, a card reader may read one or more decks of cards. In one embodiment, a video image may be taken of each card to confirm the cards within the deck are in sequential order as generally found in new decks of cards. In yet another embodiment, a non-image identifier may be used to determine the sequential ordering of the cards. This method may be used, for example, to determine all 52 cards of a deck are present, there are no double cards, and/or that no invalid cards are present.

Step 101 may also be used for multi-deck systems, such as when conducting multi-deck Blackjack. For example, identifier 210*a* may comprise information regarding the origination of the dealt card. For example, if 3 decks are utilized for a particular game, one identifier, for example, identifier 210*a*, may comprise information regarding which deck the card originated from to ensure that fewer or more than 3 decks were not being used and/or became improperly combined. For example, if a game is utilizing decks 001, 002, and 003, the card reader 206 may be configured to discard any card not from decks 001, 002, and 003. In yet another embodiment, the detection of cards not belonging to decks 001, 002, and 003 may cause the termination of the current game and a new deck or decks of cards will be shuffled to initiate a new game. In yet another embodiment, identifiers may be utilized to determine the number of times a particular card or deck of cards have been previously used. For example, in one embodiment, after a deck of cards has been used 100 times, that deck of cards is removed from the closed system and a new deck of cards is introduced. In still yet another embodiment, the identifying information retrieved from an identifier, such as identifier 210*a* may be stored in an electronic medium for later analysis (as described below).

Figure 5:
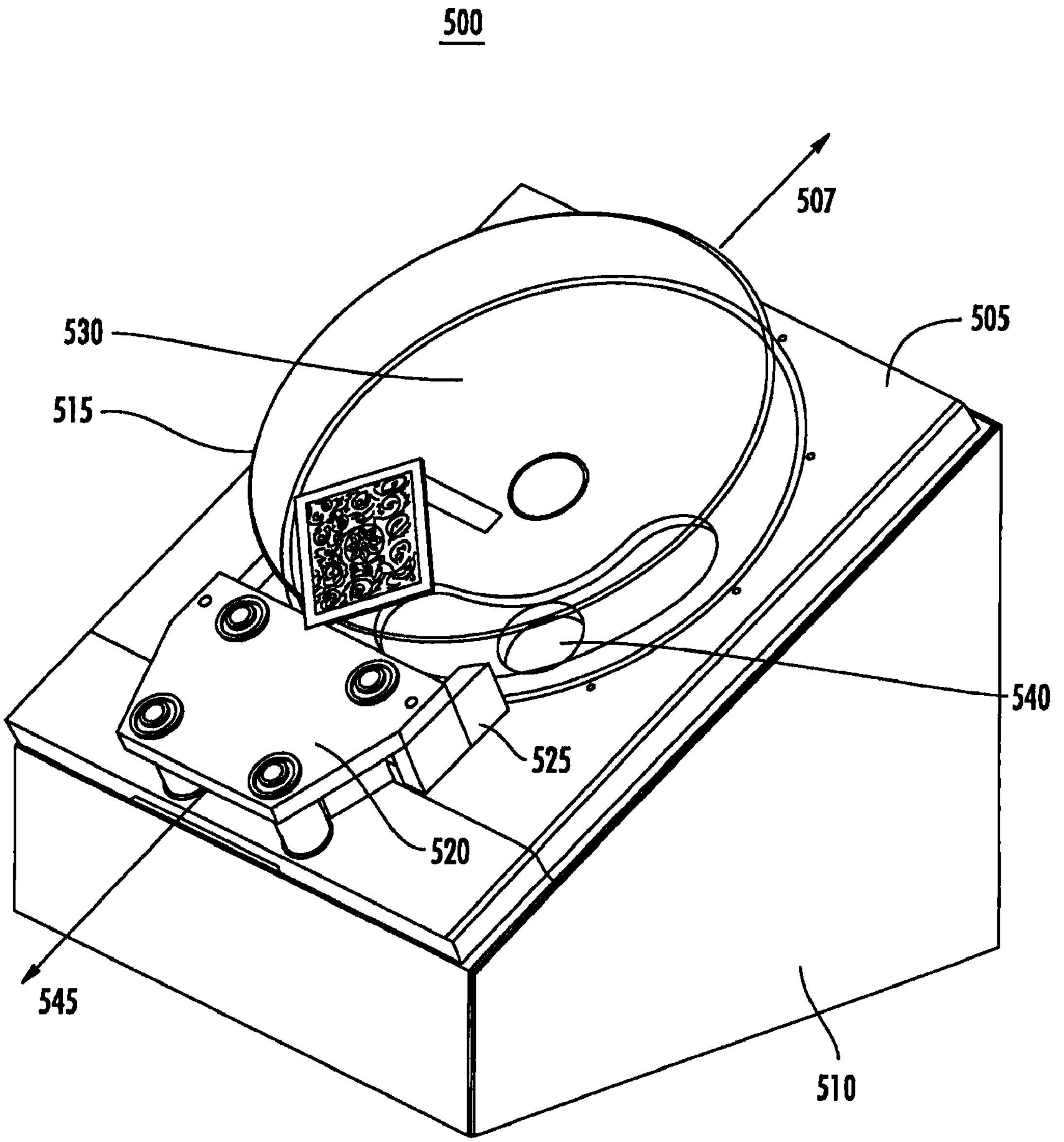
FIG. 5 shows a perspective view of one possible implementation of a scrambling device according to one aspect of the invention.

In one embodiment, step 102 may be initiated to scramble at least a portion of the plurality of cards before the completion of the validation step 101. For example, one or more identifiers, such as identifiers (210*a*, 210*b*) may be scanned or otherwise read or recorded as the card is being transported to a scrambling device (such as shown in FIG. 5). In one such embodiment, if a card is found invalid, the scrambling step, such as step 102 may be aborted and the cards are physically removed from the system. For example, as shown in the illustrative embodiment, step 103 may be implemented even before a single card is scrambled, such as in step 102. In one such embodiment, if step 103 determines at least one card is not valid, step 105 may be implemented to remove at least a portion of the plurality of cards.

In one embodiment, a transport mechanism is utilized to transport the plurality of cards through the closed system. The transport mechanism may have two or more "stops", wherein if a card is determined not be valid, the first stop of the transport mechanism is utilized, and the cards are "dumped" or discarded from the closed system, wherein if the cards are determined to be valid, the second stop may be utilized. In one such embodiment, the second stop may be a shuffling mechanism, such as may be utilized in step 104. One skilled in the art will readily appreciate that step 103 may be initiated before, during, or after any step prior to actually using the data obtained from the card, such as may be retrieved from the identifier(s) (210*a*, 210*b*), in an actual game.

In step 102, a plurality of cards may automatically be scrambled. While some semi-automated card shufflers quickly shuffle one or more decks of cards, this does not adequately recreate live play, which often may include a manual scrambling procedure by the dealer. Indeed, those skilled in the art readily understand that even a good shuffling device cannot truly randomize cards as only the cards actually displaced by the shuffler actually are re-arranged, thereby leaving the majority of the cards in the same order as before entering the shuffling device. Scrambling, also referred to as washing, is considered a more thorough randomizing technique where a person places the cards (generally face down) over a surface, such as a table, and randomly spreads the cards over the surface in a random fashion. By increasing the randomness of the ordering of the cards, players are more likely to trust the game.

Step 102 may be fully automated, therefore allowing for remote operation and, as discussed above, increase the trustworthiness of the process by preventing direct human intervention. The structure and operation of exemplary scrambling devices that may be used in one or more embodiments of the invention are more fully described in relation to FIGS. 5-9. Scrambling step 102 may be used in conjunction with one or more shuffling steps, such as shuffling step 104. Step 104 involves the physical movement of a plurality of cards, such as deck of cards 202, as shown in FIG. 2. Step 104 may be performed through mechanical or electrical mechanisms; however, the cards are physically shuffled. Therefore, the final order of the cards is not determined solely by a random number generator or algorithm. One skilled in the art will realize that one or more embodiments may utilize an algorithm to determine the longevity of the shuffle or the like, however, the final order of the cards cannot be accurately predicted upon applying one predetermined algorithm. Moreover, one skilled in the art will readily appreciate that a scrambling step, such as step 102 may occur without a shuffling step, such as step 104. In yet other embodiments, the number of shuffles occurring in step 104 may vary from one instance to the next. In one embodiment, the use of a scrambling step may reduce the number of shuffling instances in step 104. Likewise, an increase in shuffling instances may reduce the duration of a scrambling step.

Shuffling device 204 of FIG. 2 illustrates one exemplary automatic shuffling device according to one embodiment of the present invention that may be used to perform step 104. In one embodiment, the shuffling device 204 is configured to house a plurality of gaming instruments, such as standard poker playing cards. In other embodiments, the shuffling device is configured to house odd shaped or three-dimensional "cards", such as balls. Indeed, one embodiment of the invention may utilize a chamber to house the cards, wherein pressurized air is introduced into the chamber having the plurality of cards. As used herein, pressurized air may include but is not limited to: gas(es) under pressure as compared with the ambient pressure, forced gas(es) at either standard or elevated pressure that is traveling at a higher velocity than ambient air, and combinations thereof. The pressurized air may alter the arrangement of the plurality of cards in a random fashion. This method of shuffling is especially advantageous when utilizing three-dimensional cards, such as balls. In one embodiment, the cards are shuffled for a predetermined length of time, whereas in another embodiment, a user input may determine the longevity of the shuffle.

In step 106, a card is physically dealt, such as from the deck of cards 202. In one embodiment, the top card of the deck will be dealt; however, one skilled in the art will appreciate that other embodiments may draw a card at random. For example, embodiments having balls in a pressurized chamber may be randomly selected. While the cards are physically dealt, select embodiments may not remove the card from the shuffling device. Indeed, in one embodiment having a closed system, such as that described in relation to step 101, the card is merely transferred to another section or compartment of the shuffling device 204. Yet in other embodiments, the card is dealt from a device that is separate from the shuffling device 204. In step 108, the identity of the dealt card is determined. In one embodiment, steps 106 and 108 may occur substantially simultaneously, wherein the identity of the card is determined as it is physically dealt.

At step 110, the identity of each card dealt in step 106 may be electronically stored on one or more computer readable mediums. The identity of the cards is stored in correlation to the sequence the cards were dealt in. While one skilled in the art will readily appreciate that the identity and sequence information may be stored in any format and arrangement, including but not limited to, plain text, ASCII, and/or a proprietary format, the Applicants have found that storing and retrieving the information in a database, such as Microsoft® Access, provides acceptable results.

In one embodiment, if 52 standard playing cards were dealt and subsequently identified in steps 106 and 108, a database listing for those cards may comprise 52 rows (hypothetically numbered 1 to 52) having at least one column filled with the identifying information for each card, respectively. For example, the card whose information is stored in row 1 of the listing may be considered the top card in the "virtual deck", wherein the information stored in row 52 of the listing may be considered the bottom card of the "virtual deck". For purposes of clarity, the terms "database listing" and "listing" are used throughout the Specification to refer to the electronic storage of the dealt cards, but as discussed above, any techniques that allows the electronic recordation of identifying information is contemplated in the scope of the invention.

The one or more computer-readable mediums may be on the same or different computing devices. In one embodiment, at least one computer-readable medium is remote, and may be accessed, for example, by a network configuration, such as network configuration 300 shown in FIG. 3. In yet another embodiment, the listing may comprise additional information, such as previous usage of the cards, (i.e., the card was a burn card in a specific game in the past).

Figure 3:
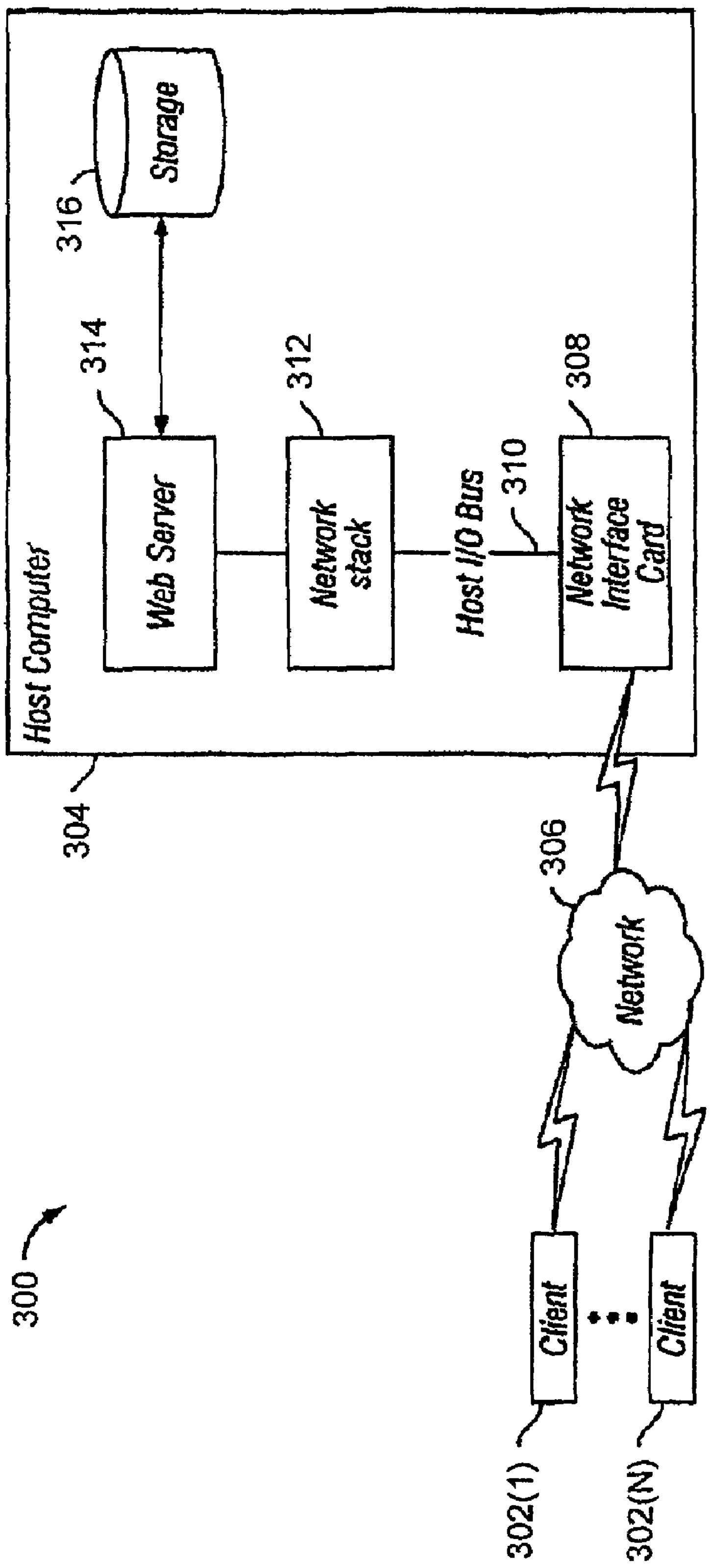
FIG. 3 illustrates one possible network configuration having a client/server network setup that may be used with select embodiments of the present invention.

One embodiment of the invention allows remote operators, players, and regulators to monitor and/or participate in the physical game through a network, such as the World Wide Web. FIG. 3 illustrates one possible network configuration (300) having a client/server network setup. In the network configuration 300, clients 302(1)-302(N) can each request information from a host computer 304 across a network 306. (N represents a whole number.) The client 302(1), for example, may send a request across the network 306 to join a game session. In one embodiment, the request may arrive at the host computer 306 at a network interface card (NIC) 308. From the NIC 308, the request can travel along an input/output (I/O) bus 310 and through a network stack 312 to web server 314 running web server software. The web server may also comprise software to allow game play or be electronically connected to a computer-readable medium having the necessary software to allow game play.

The web server 314 handles the request (including any necessary connection setup and information retrieval) and, if necessary, reads information from a local storage mechanism 316 such as a buffer or a data cache. The web server 314 may then return any content requested by the client 302(1) to the client 302(1), with the content traveling through the network stack 312, the I/O bus 310, the NIC 308, and the network 306. Likewise, clients 302(1)-302(N) can each send and receive information to each other, such as for example, chatting and/or card information.

Returning to FIG. 1, the identity of each card determined at step 108 and placed into electronic format, such as the database listing described above, may be validated at step 112. In one embodiment, step 112 may incorporate one or more processes or information from step 101. For example, analysis at step 112 may determine that each card identified in step 101 has been dealt and stored on the at least one computer-readable medium in step 110. Additional analysis may include ensuring that cards not identified in step 101 are not present within the cards dealt in step 106 and/or other steps to ensure the validity of the deck. In one embodiment, the determination of validity may be determined from the deck ID information and the card ID that was gathered when the card was identified in step 108. In one embodiment, a database listing created at step 110 may be compared with a database listing created at step 101 when initially validating the cards to ensure the same cards were dealt in both occasions (albeit in a different sequence).

If at step 112, if at least one card is not validated, the operation may send an alert, revert to different processes, terminate the operation, and/or other mechanisms to ensure validity of the game. In one embodiment, the determination that one or more cards may not be valid may cause the process to terminate. In yet another embodiment, one or more error messages may me transmitted to one or more players, operators and/or third-parties. In yet another embodiment, the process may revert to one or more previous steps shown in FIG. 1. For example, step 100 may be re-initiated, wherein the plurality of cards dealt in step 106 are discarded and new cards are introduced into the system. As one skilled in the art will appreciate, fewer or additional steps may be taken to prevent unauthorized introduction of cards into the process. If, however, the cards are determined to be valid, step 114 may occur.

At optional step 114, computer-executable instructions may further rearrange the sequence of the cards dealt in step 106. For example, in one embodiment, the sequence of the rows may be reversed, such as the card in slot 52 will then be at the "top" of the virtual deck and the card in slot 1 may then be considered the "bottom" card of the deck. As one skilled in the art will readily appreciate, each of the 52 cards of a standard deck may be repositioned to each of the 52 rows, thereby creating 2,704 possible arrangements. While one or more algorithms may be utilized in repositioning the cards or determining the duration of repositioning the cards among other factors, an algorithm is not utilized to serve as a random number generator for recreating a "fake" deal, rather the sequence of the dealing of step 106 is utilized when resorting any sequences.

In step 116 the identities of the dealt cards are transmitted to at least one user. A user may include, but is not limited to: a third-party who will individually administer a game using the information, such as in the form of the database listing described above and/or a "user" may be a third-party, such as a regulator ensuring accuracy of the game. Transmission may be performed through a variety of mediums, such as the network environment illustrated in FIG. 3. Moreover, the data may be replicated and/or copied to a secure server. In such an example, the original file may be retained in a read-only file that may be utilized for verification purposes, such as one or more validation procedures presented in FIG. 1*c*.

If, for example, at least one "user" is a third-party who will individually administer a game with the number listing, a copy of the listing produced in step 110 or 114 may be transmitted. In one embodiment, the listing is copy-protected to prevent unauthorized access and tampering with the sequence. Moreover, as explained in more detail below, the results of any game conducted with the listing may be validated by an uninterested party, such as being compared with the listing produced in step 112 or 114.

Regardless of the "user", the administration of a game utilizing the listings described above may be conducted without the need for human scrambling, shuffling, and/or validation. Additionally, one or more card games may be administered without the need for random card generators since the sequence information used for the games is created from the dealing of an actual deck of cards or derived from the dealing of an actual deck of cards.

Further aspects of the invention relate to the utilization of the information gathered in one or steps above, in conjunction with or independent of additional steps or processes, to conduct one or more games. For example, the games may be conducted by the "user" described in step 116 or by other third parties. The exact administration of the game may depend on the traditional rules of a particular game, and/or local regulations and laws. Specifically regarding the rules of particular games, in some card games, it is customary to allow at least one player to cut the deck, therefore optional step 118 may be implemented to determine if the game allows cutting and/or other forms of rearrangement of the cards by a player. If the employed embodiment permits a user or player to cut the deck, step 120 may be implemented to receive an input from a player regarding the cutting of the virtual deck of cards as stored on the computer readable medium, for example, as represented in the database listing.

Figure 4A:
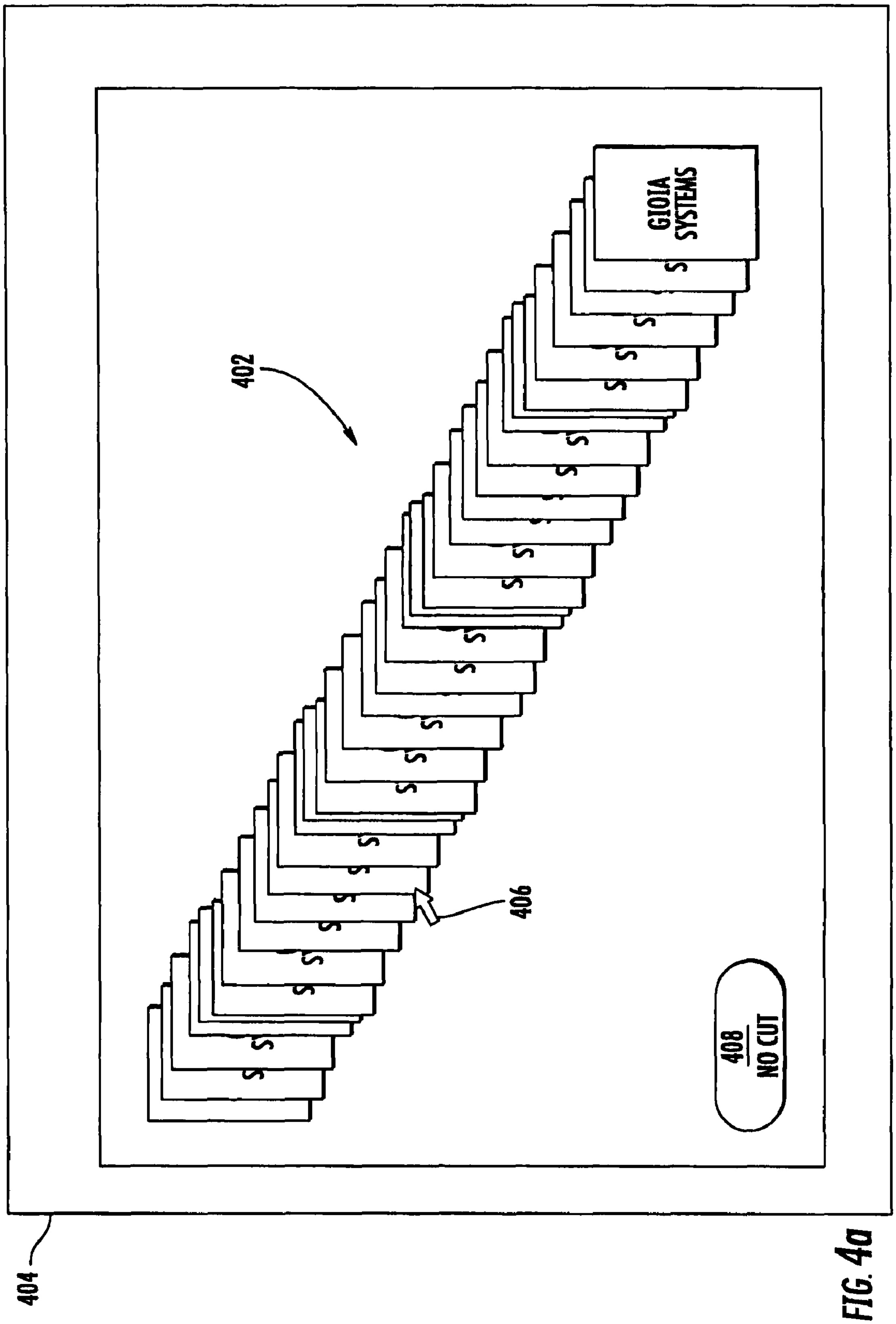
FIG. 4*a* depicts an exemplary method of allowing a user to cut or otherwise rearrange the arrangement of virtual playing instruments according to one embodiment of the present invention.
Figure 4B:
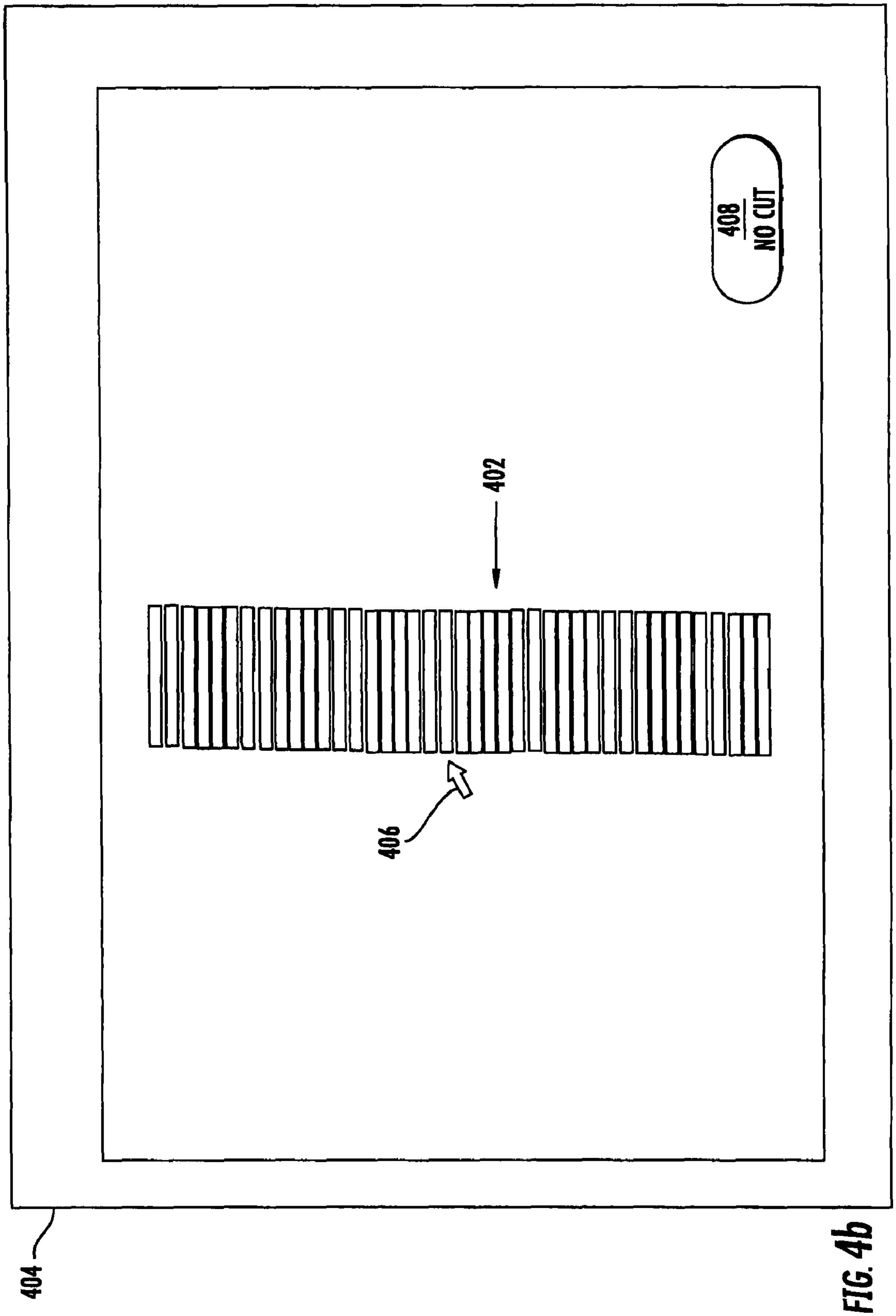
FIG. 4*b* depicts another exemplary method of allowing a user to cut or otherwise rearrange the arrangement of virtual playing instruments according to one embodiment of the present invention.

FIGS. 4*a* and 4*b* show exemplary methods of allowing a player to cut or otherwise rearrange the arrangement of virtual cards in the database listing. With reference to both FIG. 4*a* and FIG. 4*b*, a graphical representation of the deck of cards or a portion thereof, such as representation 402 can be displayed on an output device, such as monitor 404 operatively connected to a client 302(1)-(N). The user may provide an input through an input device to select a location to "cut" the deck. For example, arrow 406 may be positioned to select a specific card within the graphical representation of the deck of cards 402. As seen in FIG. 4*a*, the graphical representation of the cards portrays a plurality of cards presented to the user "face down", for example as spread across a flat surface such as a poker table. The graphical representation shown in FIG. 4*b* portrays a plurality of stacked cards, for example, such as when arranged in a deck. The player may be allowed to choose any individual card within the graphical representation 402, wherein each card displayed to the user is electronically mapped to one virtual card stored on the computer-readable medium, such as the database listing. For example, in one embodiment, each graphical representation of a card comprises at least one interactive "pixel point". The interactive pixel point is selectable by a user-input device, such as a mouse operated by the player. In operation a player may select a pixel point of a specific card within the plurality of cards by navigating a mouse over the pixel point and actively "select" the card by pressing a button on the mouse, thus providing a user-input.

Once selected, the user input may be transmitted through the network, for example as described in relation to FIG. 3, to a computer-readable medium containing the database listing, where the "virtual" deck represented by the rows of the database listing is "cut" according to the user input. Upon being cut, the next sequential card in the listing will be utilized. For example, if the player determines to cut the card represented by the $12^{th}$ row in the listing, the card represented in the $13^{th}$ row of the virtual deck will be dealt. In other embodiments, shuffling may occur until a user input is received. In one embodiment, further processes will not occur unless a user input is received in step 120. This may be especially advantageous to eliminate the use of automated programs for playing games. In such embodiments, if a player does not provide a user input to select a card to cut, the program may time out, thereby preventing the game to be played. In another embodiment, the player may select button 408 to provide a user input without being forced to pick a card to cut from the deck. Of course, one skilled in the art will realize that in some games a cut may be desired, and therefore another mechanism may be implemented to ensure an authentic user input is received before beginning the game.

At step 122, game play utilizing the listing may be initiated or continued, depending whether step 120 and/or others steps are utilized. For example, one or more cards may be dealt in sequential order as per the listing. The exact dealing of cards, usage of burn cards, and other factors will depend of the type of game being administered, the number of players, and other variables which may be predetermined by the players, administrators, or a combination thereof. For example, in Draw Poker, the conventional poker hand rankings that are winning combinations are a Royal Flush, a Straight Flush, a Four of a Kind, a Full House, a Flush, a Straight, a Three of a Kind, a Two Pair and a Pair of Jacks or Better, wherein a payout table is established based on the number of coins wagered by the player and the type of poker hand achieved.

One skilled in the art will understand there are many poker formats used in poker. These poker game formats include, but are not limited to: Jacks (or even Tens) or Better Draw Poker, Bonus Poker, Double Bonus Poker, Double Double Bonus Poker, Super Double Bonus Poker, Triple Bonus Poker, Deuces Wild Poker, Jokers Wild Poker, Deuces and Jokers Wild Poker, Texas Holdem Poker, Omaha Hi Poker, Omaha Hi Lo Poker, Stud Poker Hi, and Stud Poker Hi Lo. One skilled in the art will realize that these and other games of the present invention may be played with a wagering system, wherein the wagering system may vary, such as limited and no limit stakes. In yet other embodiments, other traditional card games may be employed, such as Black Jack, Caribbean Stud, or the like. In one embodiment, the system is configured to allow a player to choose among numerous game formats. The player may then make a wager based on upon that choice of game format.

Figure 1B:
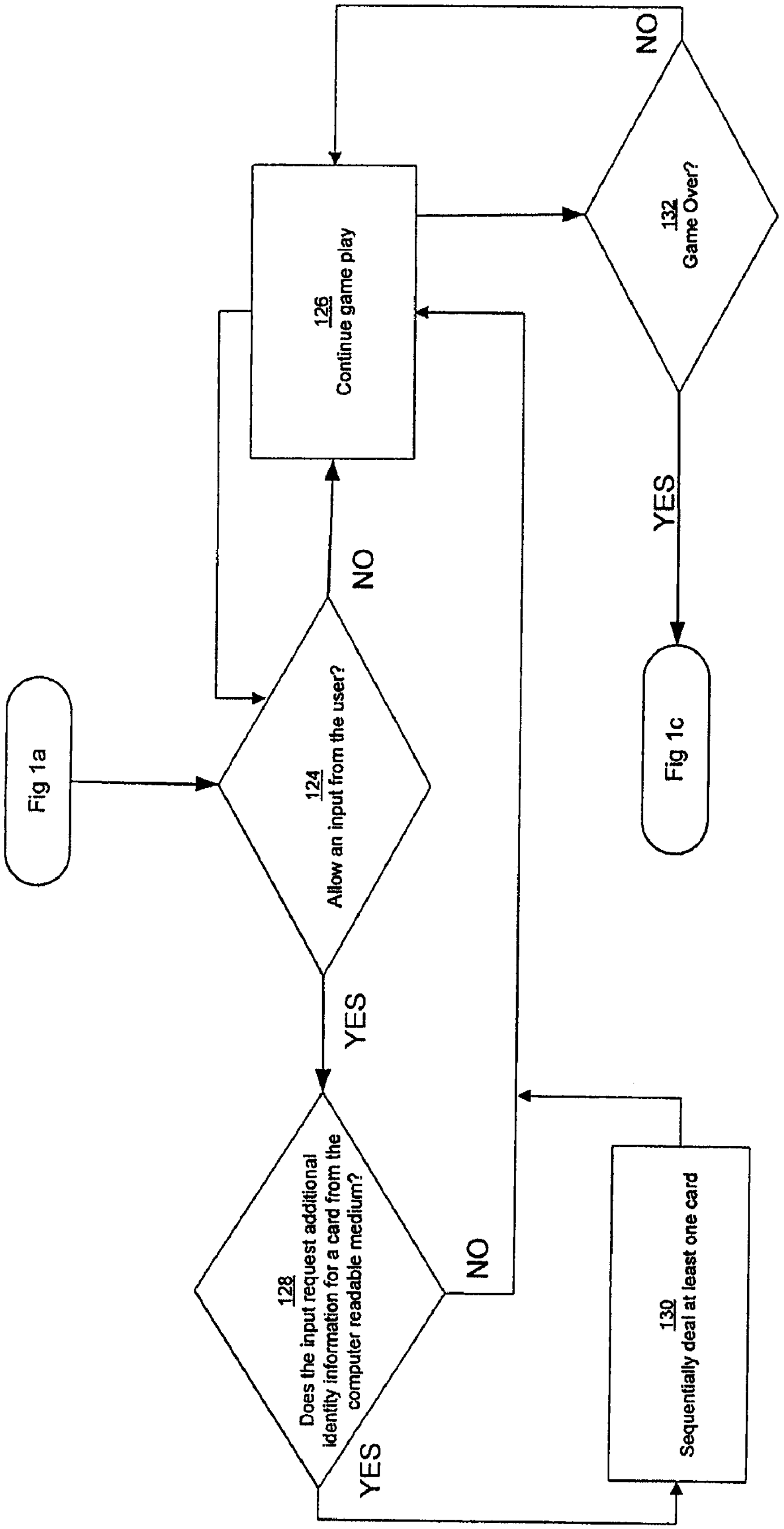
FIG. 1*b* is a flowchart depicting one exemplary method of conducting a game with a virtual set of playing instruments according to one embodiment of the present invention.

FIG. 1*b* shows a flowchart depicting one exemplary method of playing a game with the virtual set of playing instruments according to one embodiment of the present invention. To provide an illustrative example of how different game formats be used with the present invention, step 124 may be implemented at anytime throughout the game subject to rules of the particular game to allow the player to provide an input, for example, to instruct the computer that the player does not wish to be dealt another card. As step 126 indicates, game play will continue according to the type of game being administered. If, however, the player does provide an input in step 124, step 128 maybe implemented to determine if the additional information regarding card identity is received from the database listing or other file created on a computer-readable medium comprising information about the card identification. If at step 128, it is determined that information regarding at least one additional card is required, step 130 may be initiated to "deal" at least one card according to the database listing.

Returning to step 126, game play will resume until it is determined at step 132 that the game is over. As one skilled in the art will understand, step 126 may incorporate any of the preceding steps or optional additional steps to continue to the game, such as for example, "redealing" cards according to the database listing or additional database listings, and/or determining when and to whom the dealt cards are displayed to. Moreover, select card games may incorporate one or more "burn" cards. For example, in one embodiment where Texas Hold'em is being played, a burn card may be utilized during one or more rounds of dealing. For example, if the virtual card represented in the $17^{th}$ row of a database listing is the next sequential card to be dealt, but the game utilizes burn cards, the virtual card represented in the $18^{th}$ row may be "dealt" to a user. In such an embodiment, the virtual card in the $17^{th}$ row is skipped over and discarded from the virtual deck similarly to an actual burn card.

Figure 1C:
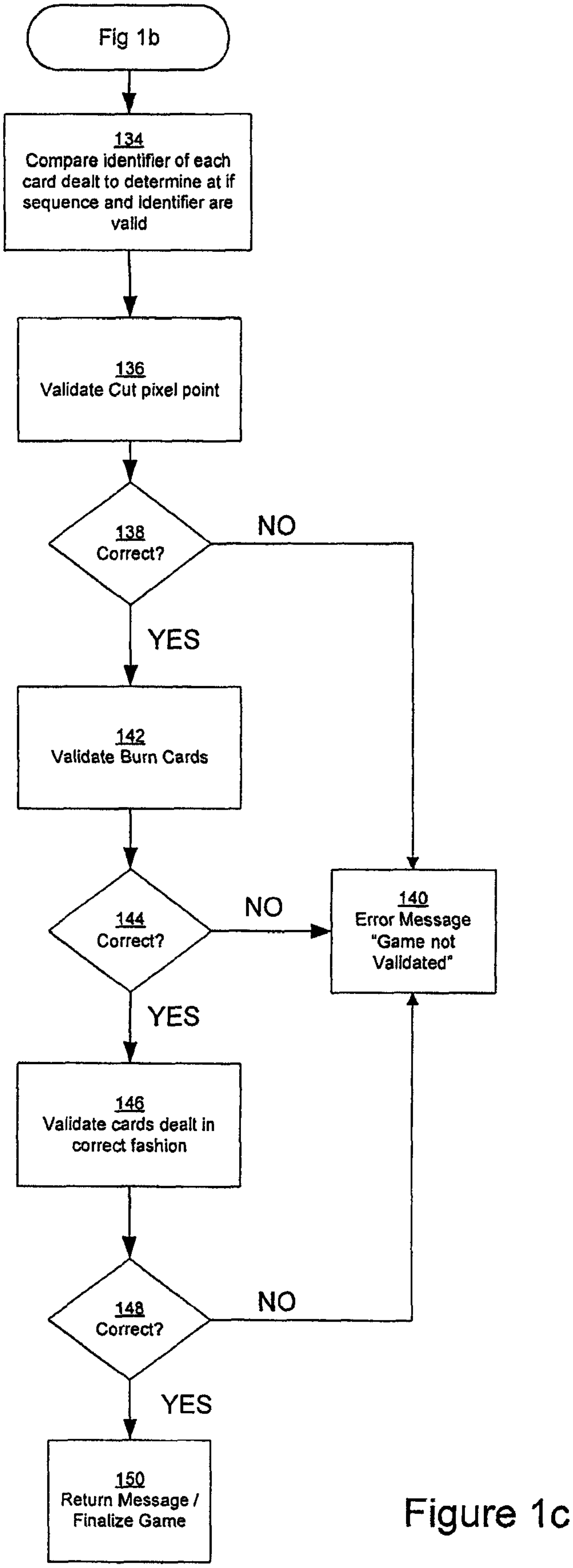
FIG. 1*c* is a flowchart of one exemplary method of ensuring validity of the game according to one embodiment of the present invention.

Once it is determined game play has ended, for example at step 132, one or validation procedures may be initiated. FIG. 1*c* is a flowchart of one exemplary method of ensuring validity of the game according to one embodiment of the present invention. In one embodiment, step 134 may compare the identity of each virtual card dealt and/or the sequence the cards were dealt during game play to ensure the validity of the game. Yet in another embodiment, steps to ensure the validity of the game may be transmitted as the game is in progress. In one embodiment, the results are remotely transmitted through a network, such as network configuration 300 to compare with the original or copy of the file created in step(s) 110 and/or 114. In one such embodiment, the person or persons creating the original file(s) are independent of the person or persons conducting the games to further protect the integrity of the process. In one embodiment, a working copy of a database listing created in step 110 was utilized during game play in which the results of the cards "dealt", "burned", "cut" or otherwise utilized in the game are transmitted to a computer device for comparison. As one skilled in the art will realize, the transmission may be through one or more secure transmission protocols, utilize one or more firewalls, require authorization, and/or include other steps to further ensure the validity of the game.

In another embodiment, optional step 136 may be initiated to ensure the "pixel point" chosen by one or more players during one or more rounds in fact was properly correlated to the correct location in the database listing or other file that corresponds with the removed virtual card. If, at step 138, it is determined the pixel point is not correct, step 140 may be implemented to send an error message to a player, operator, regulator, and or any party involved in the organization and operation of the game. If, however, at step 138, it is determined that the validation in step(s) 134 and/or 136 were successful, one or more additional validation steps may be undertaken.

Optional validation procedures may be utilized to validate one or more burn cards (step 142), and/or validate that virtual cards dealt during game play were dealt in the correct fashion in accordance to the database listing and/or rules of the game (step 146). In each instance, a process may determine if the validation procedure is successful, such as steps 144 and 148, respectively. As seen in FIG. 1*c*, if one or more of the steps is unsuccessful, an error message, such as presented through step 140 may be initiated. As one skilled in the art will readily appreciate, different error messages and procedures may be used for different findings of invalidity. For example, a finding that a pixel point was not validated may prompt an automatic analysis of select computer components, switch servers, and/or utilize back up equipment and/or database listings. Yet a finding in step 144 that a card was not properly burned may prompt analysis of different components and/or prompt notification to one or more different parties. Moreover, one skilled in the art will understand that in addition to the exemplary validation procedures shown in the illustrative embodiment there are numerous additional aspects of card games that may be monitored and checked for validity. In one embodiment of the invention, a validation procedure may terminate with step 150, which returns a notification to a party, such as a player of the game, informing them they are the winner of the game, the final score of each player, or other information relating to the outcome of the game that has been validated.

As discussed above in relation to step 102, further aspects of the invention relate to fully automated systems and methods for scrambling playing instruments, such as cards, before being dealt to one or more players. Embodiments of an exemplary scrambling device will first be described in terms of a basic structure, and then will be described in terms of exemplary functions.

Structure of Exemplary Scrambling Devices

FIG. 5 shows a perspective view of a scrambling device according to one embodiment of the invention. Exemplary scrambling device 500 comprises base plate 505. Base plate 505 may be constructed of any sturdy material, including fabricated metals, such as steel and aluminum, plastics, wood, and synthetic materials. The exact material will depend on a myriad of factors, such as for example, the desired longevity and/or costs. As seen in FIG. 5, the base plate may be positioned atop a housing, such as housing 510 to place base plate 505 at an incline in the direction of arrow 507. One skilled in the art will readily appreciate the incline may be along any axis, so long as there is an elevated portion of the chamber and a lower portion of the chamber. The exact inclination of base plate 505 will vary on the shape, size and number of playing instruments to be scrambled, among other factors, however in one embodiment wherein 52 standard playing cards measuring about 2¼ inches wide and about 3½ inches in length are to be scrambled, the inventors have found an angle of about 20 to about 60 degrees to be especially advantageous. In one embodiment, the angle of about 30 degrees provided suitable results. However, one skilled in the art will readily appreciate that other angles may be used.

Mounted on the top of base plate 505 is scrambling chamber 515 and aligner 520. Illustrative scrambling chamber 515 is a cylindrical ring constructed of sturdy material that may provide a sidewall when mounted on top of the base plate 505. In one embodiment, a transparent plastic based material may be used to further increase the security of the game. Indeed, in one embodiment, players and/or administrators may view the scrambling of the playing cards through the use of a camera or other imaging apparatus. In one embodiment, the top portion of the chamber 515 is uncovered and may only comprise the upper edges of the sidewall, for example, formed by the cylindrical ring 600, shown in FIG. 6, and discussed more below.

While the exemplary chamber 515 is cylindrical, one skilled in the art will readily appreciate other shapes may be utilized. Moreover, variations in a cylindrical shape, such as grooves or protrusions, may further allow randomization of the playing cards during one or more of the steps described below. The height and the width of the scrambling chamber may vary depending on the size, shape, and number of the playing instruments being scrambled. When scrambling 52 standard playing cards measuring about 2¼ inches wide and about 3½ inches in length, the inventors have found a vertical height of about 0.75 inches to about 2¼ inches to be especially efficient when utilizing scrambling chamber 505. Utilizing other sizes may of course change the viable dimensions of the chamber 500. For example, in one embodiment using playing cards having two sides and it is desirable not to flip over the cards while in the chamber, the chamber's vertical height should not exceed the shortest dimension (length or width) of the playing cards. Using 52 standard playing cards, the inventors have discovered excellent results utilizing a chamber having a diameter of about 8 inches to about 14 inches.

Figure 6:
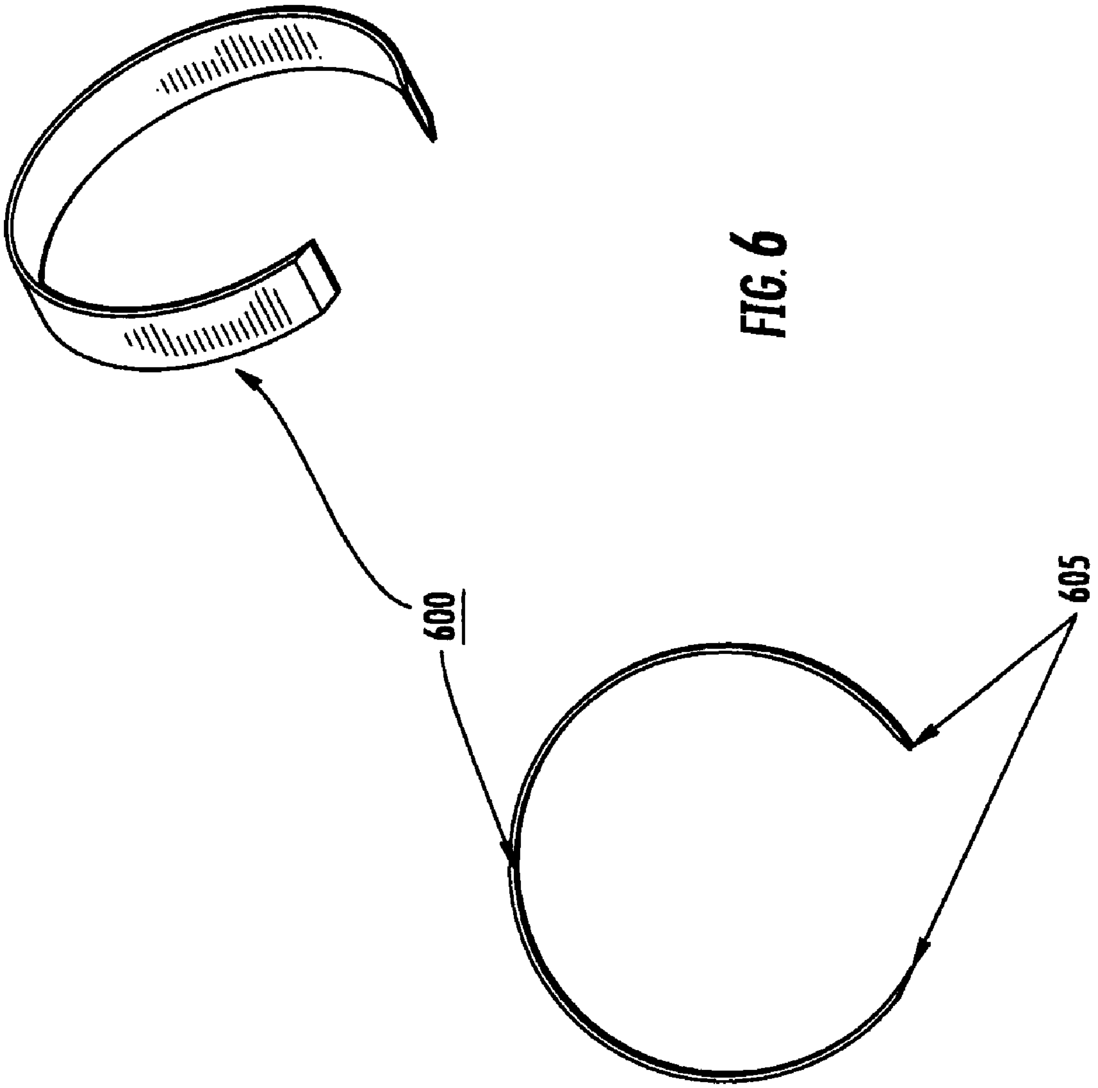
FIG. 6 shows two perspective views of an exemplary ring structure that may be used as a scrambling chamber according to one embodiment of the invention.

Looking briefly to FIG. 6, it shows a full-frontal and a frontal perspective view of an exemplary ring structure that may be used in conjunction with a bottom to form a scrambling chamber according to one embodiment of the invention. The exemplary ring structure may be mounted on top of base plate 505, thereby creating a canister-like structure where the sides of the canister are created by the ring structure 600 and the bottom of the canister is created by the base plate 505 (or a rotating plate mounted thereon, as discussed in more detail below). In the illustrative embodiment, the ring structure is not fully enclosed, but rather has two edges 605 defining a void and/or opening. In operation, the edges 605 of the ring structure 600 may be aligned with the upper left and right protrusions 525 of aligner 520. In this arrangement, the void between edges 605 allows playing cards to exit to aligner 520. (FIG. 9, discussed in more detail below, shows several perspective views of an exemplary aligner according to one embodiment of the invention). However, in another embodiment, the ring structure or any structure forming the sidewalls of the chamber 515 may be an endless member w/o openings, such as an oval, circle, etc.

In one embodiment, the chamber may have a closable lid or a permanent top that covers at least a portion of the chamber. In yet other embodiments, for example, the chamber illustrated in FIG. 5, there is no cover, but rather the top portion of the chamber is defined by open space formed substantially by the upper perimeter of the sidewalls, such as formed by the ring structure 600 shown in FIG. 6.

Figure 7:
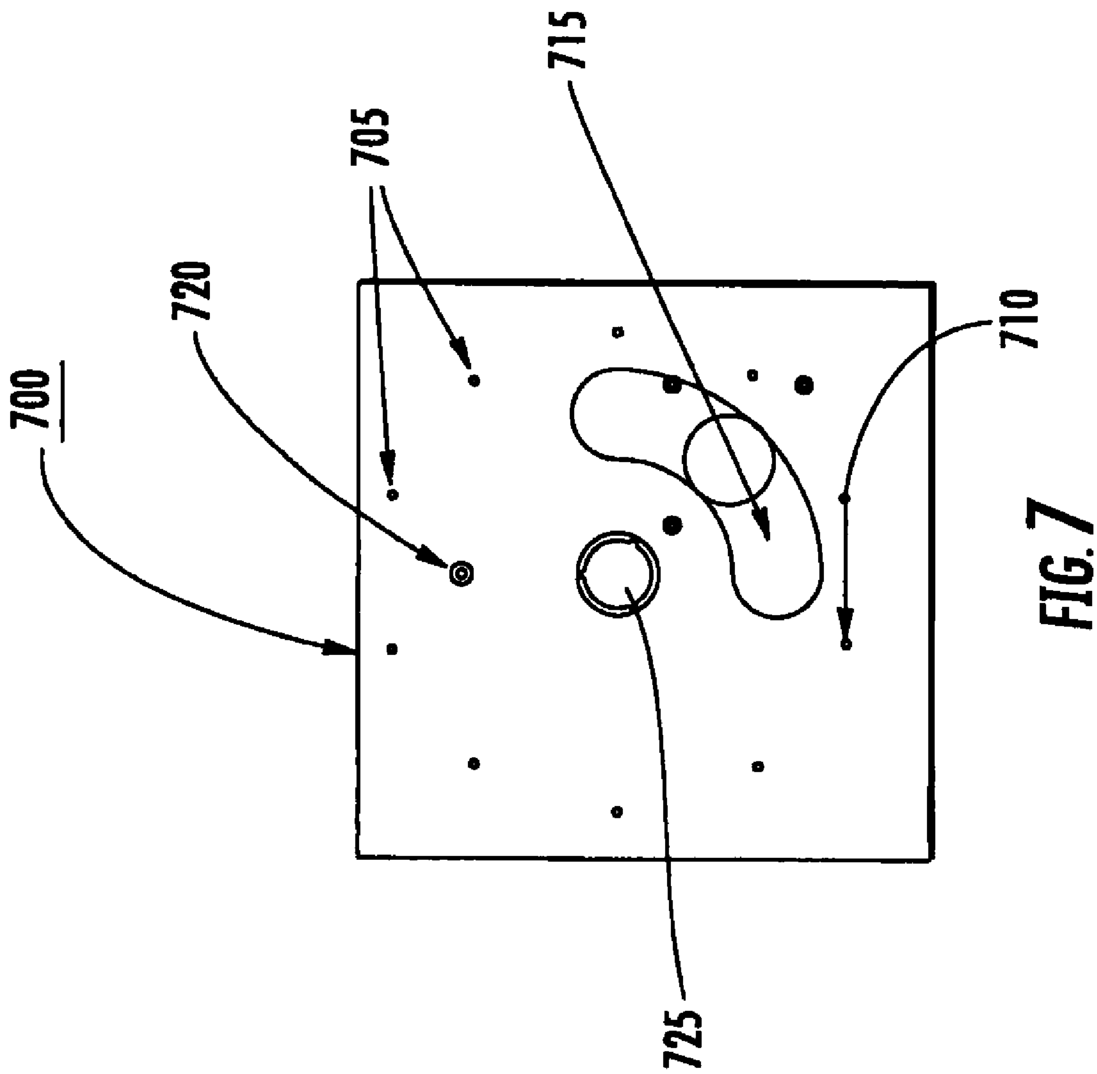
FIG. 7 shows a frontal view of one exemplary base plate according to one embodiment of the invention.

Base plate 505 may further have a rotating plate rotatably engaged thereon. Exemplary rotating vacuum plate 530 is about the same diameter of scrambling chamber 515. In one embodiment, the base plate 505 and rotating vacuum plate 530 are positioned and arranged to introduce and/or remove a gas, such as atmospheric air, into the scrambling chamber. FIG. 7 shows a frontal view of one exemplary base plate according to one embodiment of the invention that may be used in conjunction with a rotating plate to further increase the random ordering of the playing cards.

Looking to FIG. 7, exemplary base plate 700 is substantially planar. The overall shape of the base plate is not significant except that it must be at least as wide as the shuffling chamber, such as chamber 515. Base plate 700 may further include grooves, holes, or protrusions, such as exemplary holes 705 for mounting the shuffling chamber, such as scrambler ring 600 onto the base plate 700. In embodiments where scrambling ring 600 is utilized, exemplary mounting locations 710 may be used to position the two edges 605 of the scrambling ring in close proximity or in contact with protrusions 525 of aligner 520.

Exemplary base plate 700 may also comprise one or more vacuum ports, such as vacuum port 715 that is in operative communication with a vacuum source, such as a DC vacuum motor. In one embodiment, a vacuum port is positioned so that when mounted on housing 510, the vacuum port is in close proximity to the aligner 520 (see FIG. 5, which shows vacuum port 540 in close proximity to the aligner 520). Exemplary base plate 700 may also include one or more pressurized ports, such as port 720 to introduce pressurized air, for example through a DC Motor, to the scrambling chamber. As described above, pressurized air may include but is not limited to: gas(es) under pressure as compared with the ambient pressure, forced gas(es) at either standard or elevated pressure that is traveling at a higher velocity than ambient air, and combinations thereof. Exemplary uses of these ports will be described in more detail below.

Figure 8:
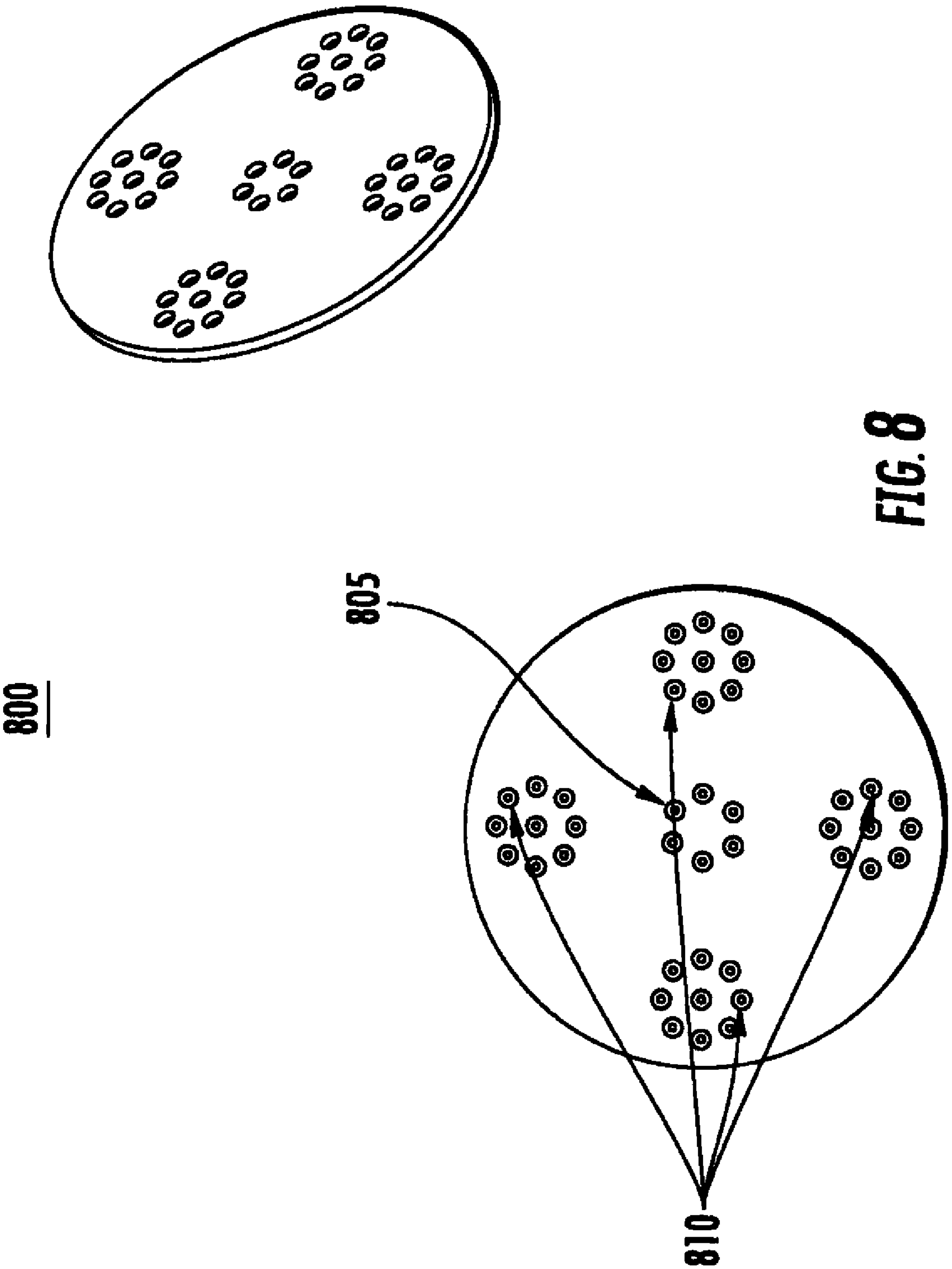
FIG. 8 shows a frontal and perspective view of a rotating plate.

The base plate 700 may also comprise a void, such as hole 725 for allowing a shaft, crank, or other connecting device to mount and rotate the rotating plate. FIG. 8 shows two exemplary views of one rotating plate 800 that may be used with base plate 505 and/or 700. The plate 800 may comprise one or more mounting locations, such as mounting holes 805 for mounting on a shaft, crank, or apparatus for allowing it to spin rotationally in relation to the base plate 505 or 700. While the exemplary mounting location is a hole, those skilled in the art will readily appreciate that any mechanism, such as a clicking locking mechanism may allow connection of the rotating plate. In one embodiment, the vacuum plate 800 having an integral shaft may be used, thus negating the use for mounting hardware.

Vacuum plate 800 may also comprise vacuum holes integrated thereon. The location, pattern, and quantity of vacuum holes 810 may vary depending on the desired air and/or vacuum pressure utilized, the number of cards being scrambled, among other factors. In the illustrative embodiment, there are four groups of holes arranged in a circular fashion around the outer perimeter of the vacuum plate 800, such as that when the vacuum plate rotates over the base plate 505/700, at least a portion of the holes 810 in each group pass over the vacuum port 715 and/or the air port 720. In yet other embodiments, the holes 810 do not pass over the vacuum port 715 or air port 720 directly. This may be utilized, for example, when a larger quantity of air pressure or vacuum is utilized or when different amounts of pressure are desired at different locations.

The structure of exemplary aligners, such as aligner 520, are best understood after an explanation of the functioning of the scrambling device, which is explained below.

Exemplary Functions of Embodiments of the Scrambling Device

In one embodiment of the invention, 52 standard playing cards are fed into the scrambling chamber 515/700 having a rotating vacuum plate 530 as a base. In one embodiment, individual cards enter the chamber at a 20 to 60 degree angle in relation to the vacuum plate 530. The vacuum plate rotates at a velocity of about 10 to about 80 rpm. In one embodiment, the rotation continues for about 18 seconds. The inventors have found that in one embodiment, all 52 cards are in the scrambling chamber 515/700 in as little as about 8 seconds. During this time, the vacuum port 715 and air port 720 may be activated.

Looking to FIG. 5 for reference, playing cards passing over the vacuum port are pulled against the vacuum plate 530 and are carried from the bottom of the chamber upwards in a circular fashion in the direction of arrow 507 until the card are at a point approximately at 12 o'clock (the top) in the chamber. Holes located in various positions in the base plate ensure that at least some of the cards positioned against the vacuum plate are grabbed by the vacuum in the vacuum holes (i.e., 810) and carried upward allowing at least a portion of the cards to be in continual motion throughout the cycle. In one such embodiment, once the cards reach the top of the chamber 515, gravity and/or another force, such as pressurized air, may then cause the card(s) or portion thereof to fall back towards the bottom of the chamber.

Air pressure may also be introduced into the process, further randomizing the ordering of the playing cards. There are a plurality of methods to introduce air pressure; however, the inventors have found two processes to be especially useful. One skilled in the art will readily appreciate these methods are merely illustrative and that other similar methods are within the scope of the invention. One method uses a DC volume air blower motor capable of delivering about 0.05 to about 1.0 CFM of air into the chamber. It may be positioned anywhere within the chamber. In one embodiment, it is positioned at approximately a position that the playing cards pass over as they rotate from the bottom to the top of the chamber. This air flow forces the cards in the chamber to separate and allows the playing cards falling from the top of the chamber to randomly intermix with the cards at the bottom of the chamber.

Another method, that may be used in conjunction with the above method, other methods, or independently uses compressed air ranging from about 20 to about 80 PSI and may be accomplished by positioning compressed air fittings. In one embodiment, the inventors have found that fittings ranging from 2 to 6 are suitable. It may be positioned anywhere within the chamber. In one embodiment, it is positioned at approximately a position that the playing cards pass over as they rotate from the bottom to the top of the chamber.

Upon completion of the "scramble" cycle, the vacuum plate 530 may decrease velocity while any air flow and vacuum is reduced or ceases, thus allowing the playing cards to accumulate at the bottom of the chamber. In one embodiment, the air flow and vacuum is substantially discontinued and the vacuum plate slows to approximately 5 rpm. An actuator or other mechanism may then create an exit pathway allowing the cards to leave the chamber. In one embodiment, sensors located at the bottom of the chamber may indicate when all the playing cards have been removed from the chamber at which time all motion in the chamber ceases. In yet another embodiment, aligner 520 may be used to aid the alignment of the playing cards after being scrambled.

Figure 9:
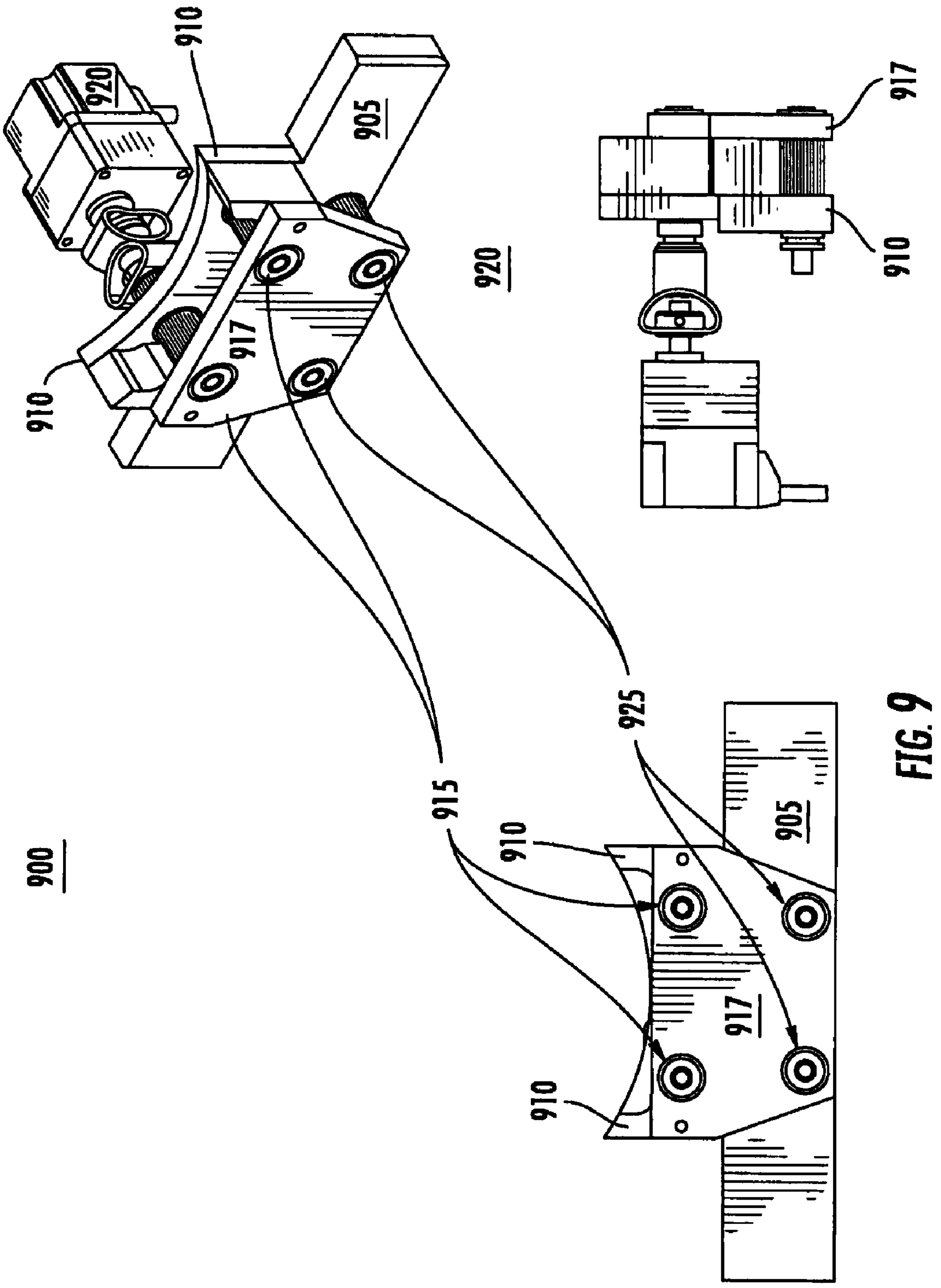
FIG. 9 shows perspective views of an exemplary aligner that may be used in conjunction with a scrambling device according to one embodiment of the invention.

FIG. 9 shows perspective views of an exemplary aligner that may be used in conjunction with a scrambling device according to one embodiment of the invention. The exemplary aligner 900 may be similar to aligner 520. As shown in FIG. 9, aligner 900 comprises an aligner base plate 905. Aligner base plate 905 may be made of any sturdy material as well known to those skilled in the art. Aligner base plate 905 may be shaped to have or further comprise extensions or protrusions, such as protrusions 910. The extensions and/or protrusions 910 may be shaped or fitted to complement the shape of the scrambling chamber 515. For example, the illustrative protrusions 910 are shaped to coincide with the edges 605 of ring 600. In such an embodiment, aligner base plate 905 may be in rigid communication with base plate 505. Yet in other embodiments, it may be a portion of base plate 505.

One or more aligner rollers 915 may extend from the aligner base plate 905 in a substantially perpendicular arrangement. As seen in FIG. 9, there are two aligner rollers in a substantially horizontal relationship with each other. The exact distance between the aligner rollers 915 will vary depending on the intended usage and a myriad of factors known or obvious to those skilled in the art. In one embodiment, the inventors have discovered that a distance of about 2¾ inches between the aligner rollers is suitable for aligning standard playing cards. The inventors have also discovered that a metal axle having a ribbed rubber outer layer also is suitable for the aligner rollers 915; however, other materials are within the scope of the invention. As seen in the illustrative embodiment, a distal end of the aligner rollers 915 may be in rotatable communication with top plate 917.

The aligner rollers 915 may also be in mechanical communication with a motor, such as motor 920, which may be a variable speed DC motor. As mentioned above, sensors located at the bottom of the chamber may be included to indicate when no cards remain in the chamber, at which time the motor 920 may stop rotating aligner rollers 915.

Another set of rollers, such as exit rollers 925 may be horizontally spaced from each other at about 1 to about 2½ inches below the aligner rollers 915. In one embodiment, the exit rollers are spaced apart at a distance equal to the width of the cards or playing instruments being used. In one embodiment, the exit rollers 925 may rotate in opposite directions with respect to each other, where the rotating action feeds cards received from the aligner rollers 915 out in the general direction of arrow 545 shown in FIG. 5. In one embodiment, sensors may be positioned to indicate when no playing cards remain in the aligner 520/900. In further embodiments, the cards are subsequently stacked or otherwise arranged for further processing. Such processing could include: descrambling, shuffling, or dealing the cards.

While the exemplary embodiment has been discussed in broad terms of a networking environment, the invention, however, may be configured for personal gaming systems, such as Sony® Playstation® or Microsoft® Xbox®, handheld systems such as a Palm® or Treo®, among others, for example, cellular-based applications. In still yet further embodiments, the invention is configured for web-based applications that may be incorporated within or independent of cellular-based applications.

We claim:

1. A computer-implemented method comprising:

(a) retrieving from a non-transitory computer-readable medium, the identity of a plurality of sequentially arranged virtual playing instruments, wherein the sequential arrangement of the playing instruments has been determined by a method comprising:

(i) physically randomizing a plurality of physical playing instruments, wherein each playing instrument comprises at least one identifier; wherein a random number generator is not utilized to determine the randomness of the physical playing instruments;

(ii) electronically determining the identity of at least two playing instruments in a sequential order before initiation of a game; and (iii) electronically storing the sequential order of the at least two physical playing instruments on one or more non-transitory computer-readable mediums to create a virtual deck of virtual playing instruments;

(b) receiving an electronic signal through a network from at least one user comprising a user input selected from the group consisting of:

(i) a user input configured to cut the virtual deck of virtual playing instruments, thereby determining the initiation point for distribution of at least two virtual playing instruments; and (ii) a user input configured to indicate the at least one user does not wish to cut the virtual deck, wherein the receipt of the electronic signal is configured to detect utilization of remote automated programs; and (c) initiating a game according to pre-defined rules that include the distribution of the at least two virtual playing instruments from the virtual deck in sequential order based upon the user input to one or more players.

2. The method of claim 1, further comprising:

(d) before (b), transmitting through a network to at least one user an electronic signal configured to provide a graphical display representing the virtual deck of virtual playing instruments to the at least one user, wherein the graphical display provides a representation of the plurality of virtual playing instruments in the virtual deck; and wherein the input from the remote user in (b) is configured to select at least one specific virtual playing instrument from the graphically represented virtual deck.

3. The method of claim of 1, wherein the physical randomization of the physical playing instruments includes a process selected from the group consisting of: shuffling, scrambling, and combinations thereof.

4. The method of claim 3, wherein the playing instruments are scrambled with an automated apparatus comprising:

a chamber positioned at an incline such that the chamber has a lower portion and an elevated portion, the chamber having a base and further being configured to receive the plurality of playing instruments with a first side facing down with respect to the chamber and a second side facing upwards;

a vacuum configured to exert a vacuum force upon at least a portion of the lowered portion of the chamber wherein the first side of at least one playing instrument is pulled against the chamber base; and a motor configured to rotate the chamber, wherein the first side of the plurality of playing instruments remains substantially downward, and the at least one playing instrument pulled against the chamber base rotates at substantially the same velocity as the chamber until rotating to a location within the elevated portion of the chamber that is not substantially proximate to the vacuum force, wherein the first side of the at least one playing instrument ceases to be pulled against the chamber base.

5. The method of claim 1, further comprising:

(d) requiring the receipt of the electronic signal of (b).

6. The method of claim 1, wherein the plurality of virtual playing instruments of the virtual deck are derived from a plurality of physical decks of cards.

7. The method of claim 1, wherein the plurality of playing instruments have a first side and a second side and further are characterized by a first dimension of substantially about 2.25 inches to about 2.5 inches and a second dimension of about 3.5 inches.

8. A computer-implemented method comprising:

(a) scrambling a plurality of physical playing instruments with an automated apparatus comprising:

a chamber positioned at an incline such that the chamber has a lower portion and an elevated portion, the chamber having a base and further being configured to receive the plurality of playing instruments with a first side facing down with respect to the chamber and a second side facing upwards;

a vacuum configured to exert a vacuum force upon at least a portion of the lower portion of the chamber wherein the first side of at least one playing instrument is pulled against the chamber base; and a motor configured to rotate the chamber, wherein the first side of the plurality of playing instruments remains substantially downward, and the at least one playing instrument pulled against the chamber base rotates at substantially the same velocity as the chamber until rotating to a location within the elevated portion of the chamber that is not substantially proximate to the vacuum force, wherein the first side of the at least one playing instrument ceases to be pulled against the chamber base;

(b) electronically determining the identity of at least two physical playing instruments in a sequential order, wherein the sequence is (i) determined after scrambling the plurality of playing instruments and (ii) not determined by a random number generator; and (c) electronically storing the identity of the at least two playing instruments of (b) on one or more non-transitory computer-readable mediums to create a virtual deck of virtual playing instruments derived from the physical plurality of playing instruments for use in one or more electronic games, wherein the identity of the at least two playing instruments is stored in correlation to the sequence the identities were determined in (b).

9. The method of claim 8, further comprising:

(d) quantifying the at least two physical playing instruments before scrambling; and (e) quantifying the virtual playing instruments in the virtual deck to ensure validity of the playing instruments.

10. The method of claim 9, wherein if the virtual deck of playing instruments cannot accurately be validated against the deck of physical playing instruments, the method further comprising:

(f) transmitting an electronic signal through a network instructing the cessation of using items selected from the group consisting of: a deck of physical playing instruments from which the virtual deck was derived, the virtual deck derived from the deck of physical playing instruments, and combinations thereof.

11. The method of claim 10, further comprising:

(g) receiving an electronic signal through a network from at least one user comprising a user input selected from the group consisting of:

a user input configured to cut the virtual deck of playing instruments, thereby determining the initiation point for distribution of at least two virtual playing instruments; and a user input configured to indicate the at least one user does not wish to cut the virtual deck, wherein the receipt of the electronic signal is configured to detect utilization of remote automated programs.

12. The method of claim 8, wherein the plurality of virtual playing instruments of the virtual deck are derived from a plurality of decks of physical playing instruments.

13. The method of claim 8, further comprising:

(d) comparing that the sequential order at least two playing instruments of the virtual deck were distributed in a game against the sequential order the at least two playing instruments were suppose to be distributed according to the sequential order of the virtual playing instruments determined in (b).

14. The method of claim 8, wherein the plurality of playing instruments have a first side and a second side and further are characterized by a first dimension of substantially about 2.25 inches to about 2.5 inches and a second dimension of about 3.5 inches.

* * * * *